United States Patent [19]

Holesha

[11] 4,374,308
[45] Feb. 15, 1983

[54] I-USE INDICATION IN A TELEPHONE KEYSET
[75] Inventor: John Holesha, West Palm Beach, Fla.
[73] Assignee: Siemens Corporation, Iselin, N.J.
[21] Appl. No.: 258,882
[22] Filed: Apr. 30, 1981
[51] Int. Cl.³ .............................................. H04M 1/22
[52] U.S. Cl. ............................. 179/99 LS; 179/99 R; 179/81 C; 179/27 FC
[58] Field of Search ............... 179/99 LS, 81 C, 84 L, 179/27 FC, 5, 27 CA, 99 M

[56] References Cited
U.S. PATENT DOCUMENTS
4,046,972  9/1977  Huizinga et al. ................. 179/99 M
4,203,011  5/1980  Coviello ........................... 179/99 M Primary Examiner—Stafford D. Schreyer

[57] ABSTRACT

A telephone keyset is disclosed which has a dialpad of dialing keys, a series of line keys, at least one function key and a telephone receiver hook switch. Each of the line keys is provided with a lamp, such as an LED, for indicating when the telephone line associated with that line key is in use. The keyset apparatus also includes a programmed device, responsive either to the operation of the function key or the hook switch, for turning off all the indicator lamps with the exception of that lamp associated with that telephone line which the keyset apparatus is currently using.

13 Claims, 18 Drawing Figures

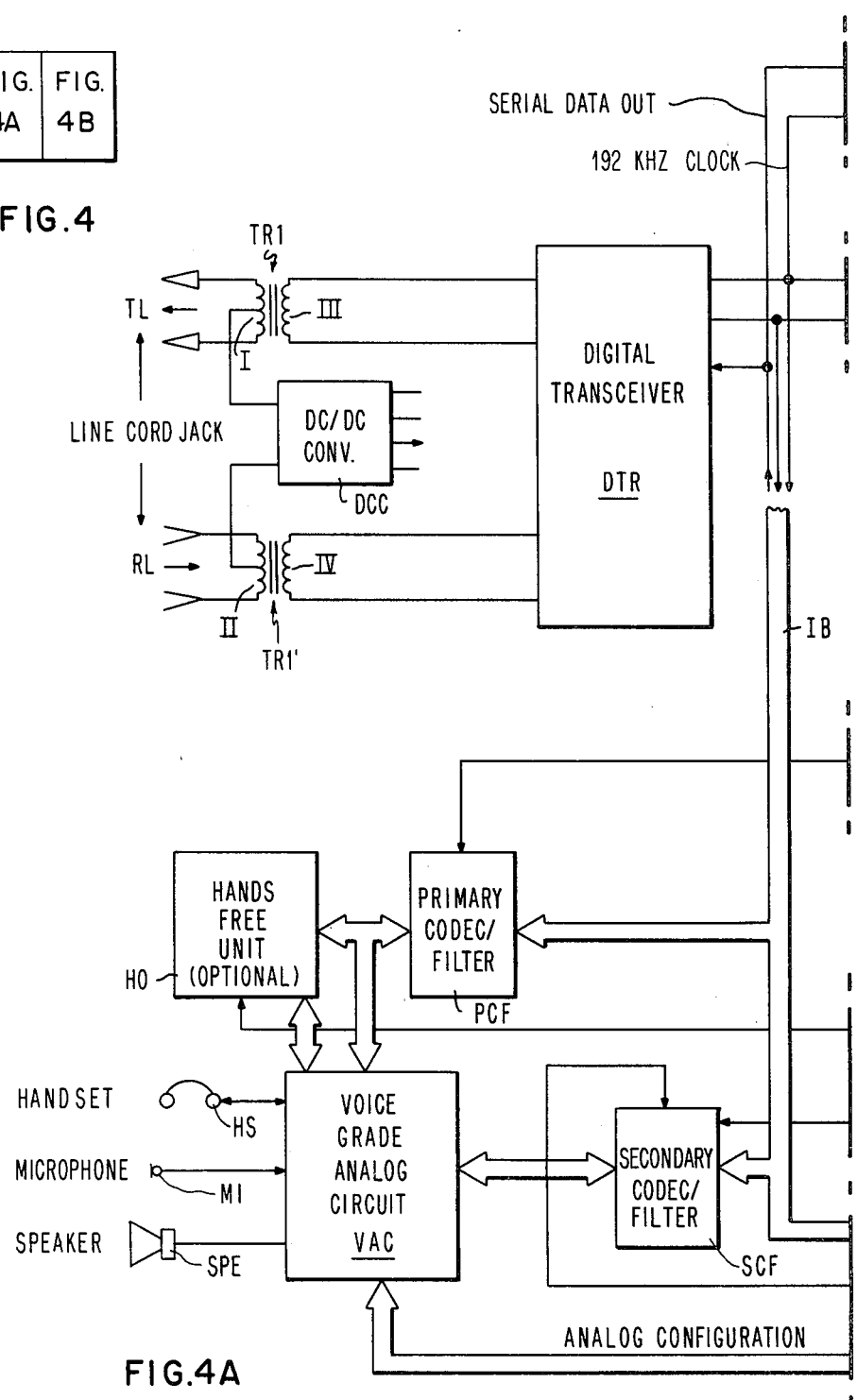

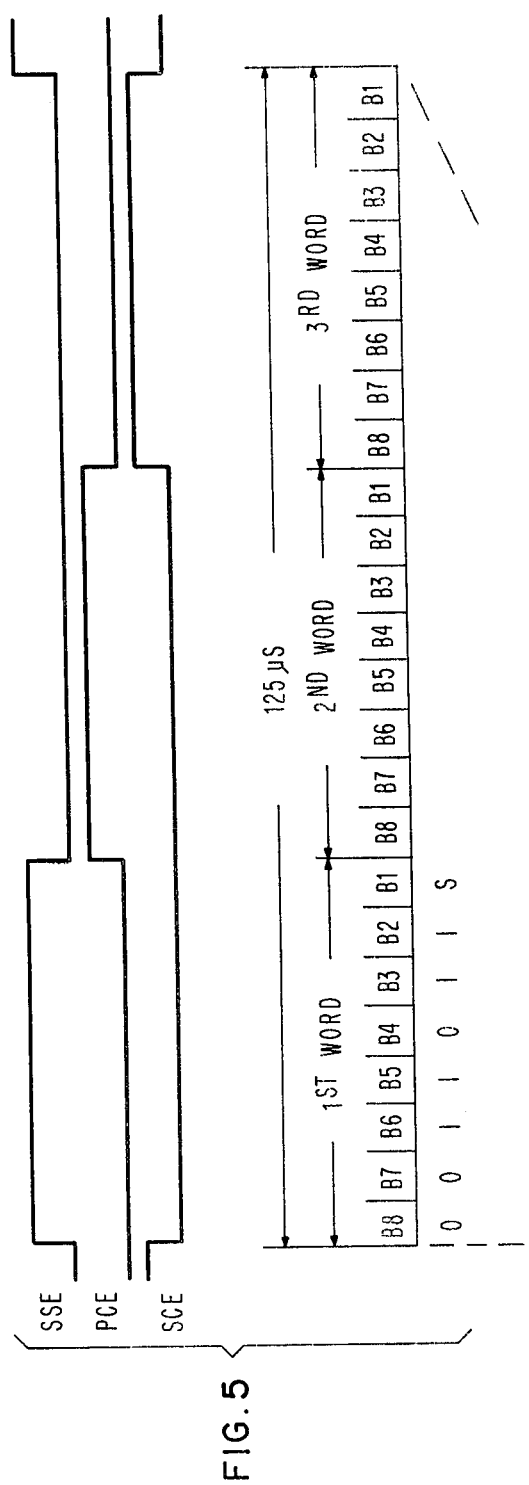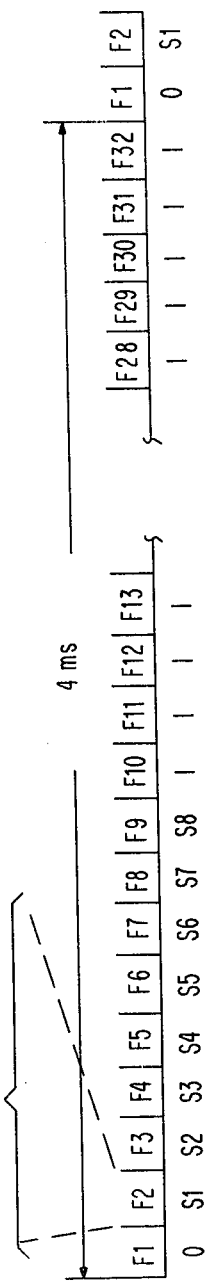
FIG. 5
FIG. 6

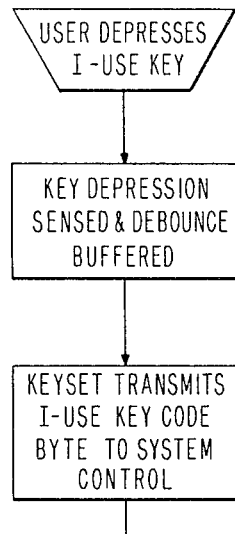

I-USE INDICATION IN A TELEPHONE KEYSET

BACKGROUND OF THE INVENTION

The present invention relates to telephone key systems, that is, telephone sets which have a number of push buttons or "keys" for selecting one of a plurality of lines to which the key system may be connected. As is conventional, each one of these line keys is provided with a lamp for indicating whether the associated telephone line has been selected.

Telephone key systems or keyset apparatus of the above noted type is well known in the art. Typically, such key systems have served to provide small offices and businesses with convenient and inexpensive telephone systems in cases where each of the office telephones are to be connectable to any one of a plurality of lines. Classically, all telephones in the key system were connected in parallel to all of the incoming telephone lines. While this arrangement is still in use in most installations, it is possible to also provide a central switch or "private branch exchange" at the point where the telephone lines are supplied to the office, and to connect the separate satellite keysets to this switch via individual line chords containing a single transmitting and receiving channel. In this way, the telephone keyset may appear to the user as part of a conventional key system, but it receives information concerning the status of the various telephone lines from the central switch. This type of key system has the advantage over the classical, parallel system that a cable containing each telephone line need not be supplied to each telephone and that the status of each telephone line may be monitored and controlled at a central point to provide cost accounting and other features which would not otherwise be possible.

All key systems, no matter what type, have the common disadvantage of confusing the user as to which line he or she is supposed to be connected. Particularly, when the key system is connected to a large number of lines (say, five or more), it often happens that the user forgets, or is not informed of the line to which his or her particular telephone keyset is, or is to be, connected.

For example, at any particular time, the telephone keyset may have a number of line indicator lamps lighted simultaneously, thus indicating that the indicated lines are in use. If a secretary of the person to whom the call is directed has received a call and placed the caller on "hold", the person to whom the call is directed may not know which line to "pick up" or select. Although, as is conventional, a line which is placed on hold may be so indicated by a flashing lamp, several lines may be on hold simultaneously, so that several lamps are flashing.

As another example, the telephone keyset user may place a party on hold while he or she attends to some other task, such as talking to another party on another line. Thereafter, when he or she wishes to pick up the original line, the number of this line may have been forgotten. As indicated previously, while each line on hold may be indicated by a flashing lamp, there may be several lines on hold at any given time.

As a third example, the key system may be provided with a feature known as "incoming call automatic line preference" which automatically receives calls and rings the appropriate keyset or keysets to which the call is directed. If the user of that keyset is talking on another line, he or she is made aware of the incoming call and can quickly terminate the current conversation. Thereafter, after this station user hangs up the receiver on the telephone keyset hook switch—i.e. goes "on hook" in telephone terminology—the waiting telephone call may be accepted by either pressing the appropriate line key and going "off hook" again or just going off hook and allowing the incoming call automatic line preference to select the line. However, if several lines are in use, and particularly if several indicator lamps are flashing, the station user will know neither which line should be selected, in the case where he or she overrides the incoming call automatic line preference by preselecting the line, nor which line was selected, in the case where he or she goes off hook and lets the incoming call automatic line preference select the line.

Similarly, where the key system is provided with an "outgoing call automatic line preference" and selects an idle line, the last-used line or a prime line, the caller may not know which line he or she has been connected to. This information may be needed by the caller some time later, for example if he or she wishes to place the call on hold and then return to it.

SUMMARY OF THE INVENTION

It is an object of the present invention to provide telephone keyset apparatus which can eliminate the confusion and difficulties referred to above.

This object, as well as other objects which will become apparent from the discussion that follows, are achieved according to the present invention, by providing means, responsive to the operation of a special feature button or key, or responsive to the actuation of the receiver hook switch, which causes all the line indicator lamps associated with the line keys to go dark except that one indicator lamp associated with the line key for that telephone line to which the keyset is, or is to be connected. The duration of this unique condition can be controlled either by the length of time that the feature key is held depressed or by an administrable timing interval starting with the time when the feature key or receiver hook switch is initially depressed. After the special feature key is either released or the predetermined time interval ends, all the lamps are allowed to return to their current status-indicating state.

In the case where the means for automatically turning off the indicator lamps is responsive to the hook switch, this feature sequence may be automatically invoked, using the administrable timing control method, on telephone keyset apparatus which is programmed with incoming and/or outgoing call automatic line preferences. According to the invention, the triggering mechanism, which initiates the feature sequence, is when the telephone keyset apparatus goes off hook.

Thus, the telephone keyset apparatus, according to a preferred embodiment of the present invention, has a single light emitting diode (LED) indicator arranged on each of the line keys to display the current status of the associated line (used or unused). Since the keyset apparatus is arranged for multi-line pick up, a given apparatus may have a number of indicators lighted at any given time.

In order to distinguish which line the user of the keyset apparatus is on at any given moment, the user can depress the special function key to locate this line. For example, after the user has placed a line on hold, he or she may wish to come back to it but has forgotten momentarily which line it was. As another example, the keyset user may wish to know his or her line while talking on a call. Depressing the special feature key causes all the LED indicators to go dark except the one associated with the line presently being used by that keyset. After the special function key is either released or the timing interval ends, all the LED's return to their current status-indicating state.

BRIEF DESCRIPTION OF THE DRAWINGS

FIGS. 4A and 4B, when arranged as shown in FIG. 4 illustrate a telephone keyset apparatus usable in the system of FIG. 3.

FIG. 5 is a timing diagram of a serial data frame employed in the apparatus of FIG. 4 and comprising three 8 bit words.

FIG. 6 is a timing diagram of a superframe employed in the apparatus of FIG. 4 and comprising 32 frames as shown in FIG. 5.

FIGS. 11A and 11B, when arranged as shown in FIG. 11 illustrate a flow chart detailing the operation of one preferred embodiment of the present invention.

DESCRIPTION OF THE PREFERRED EMBODIMENTS

Figure 1:
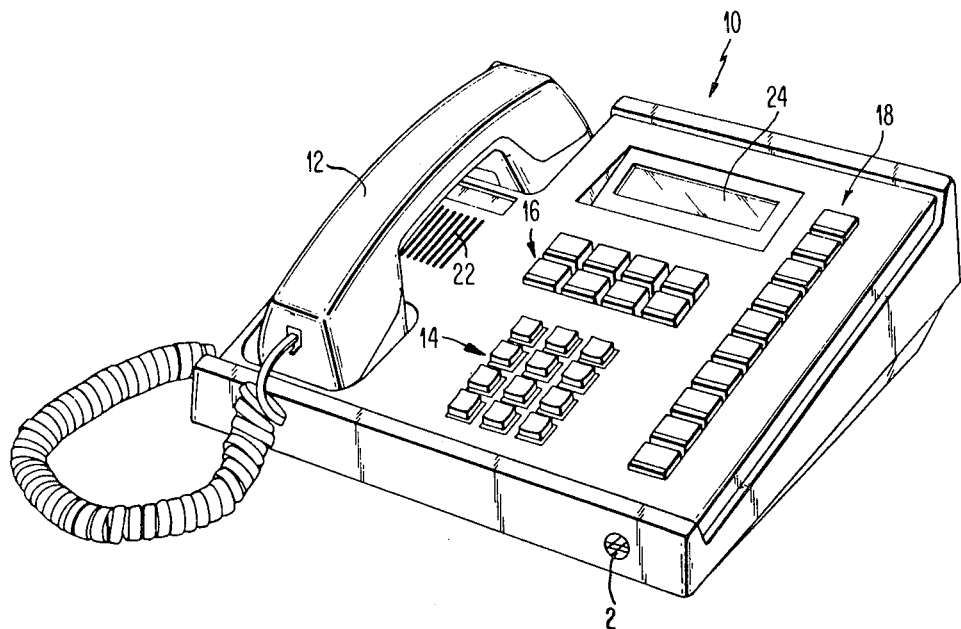
FIG. 1 is a perspective view of a telephone keyset apparatus of the type to which the present invention relates.

The preferred embodiments of the present invention will now be described with reference to FIGS. 1-12 of the drawings. Identical elements in the various figures are designated with the same reference numerals.

FIG. 1 shows telephone keyset apparatus 10 having a receiver or "handset" 12; a dial pad 14 comprising at least 10 dial keys for dialing a number; a line keyset 16 comprising a number of line keys, each associated with a different telephone line; and a function keyset 18 comprising a number of function keys, each associated with a particular function which may be performed by the keyset apparatus.

The telephone keyset apparatus 10 also includes a microphone 2 and a speaker 22 for "hands free operation" (operation without use of the handset 12) and includes a display 24. The display indicates numbers or words (e.g., names) called up from the memory of the telephone keyset apparatus by means of one of the function keys 18.

As is conventional, the telephone keyset apparatus 10 has a hook switch (not shown) arranged beneath the receiver or handset 12 to indicate whether the handset is "on hook" or "off hook".

Figure 2:
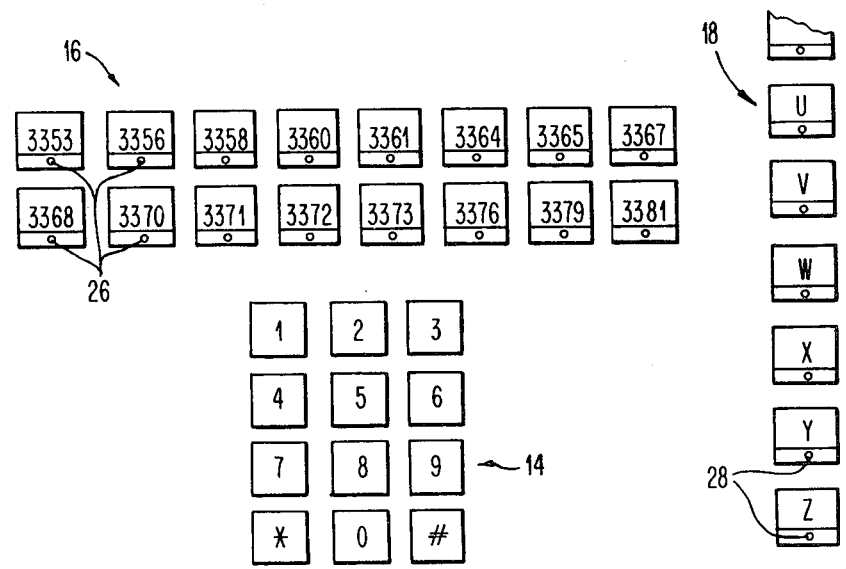
FIG. 2 is a diagram showing the various keys on the keyset apparatus of FIG. 1.

FIG. 2 shows the dial paid 14, line keys 16 and function keys 18 in greater detail. The dial keys are numbered in the conventional fashion familiar to all telephone users. The line keys 16 are each associated with a particular telephone line which is designated by a number imprinted on the key. For example, the keys 16 have the numbers 3353, 3356, 3358, etc., all of which belong to a common exchange.

In addition to the numbers, each line key has an individual lamp 26, in this case an LED, which indicates whether the telephone line associated with that key is in use. Lines that are placed on hold are normally indicated by a flashing lamp.

The function keys 18 have been designated by letters U, V, W, Z, but normally the respective function associated with each of these keys is more explicitly described. For example, the function provided according to the present invention may be designated: "I-USE".

The function keys 18 may also be provided with lamps (LED's) 28 to indicate when they have been depressed.

Figure 3:
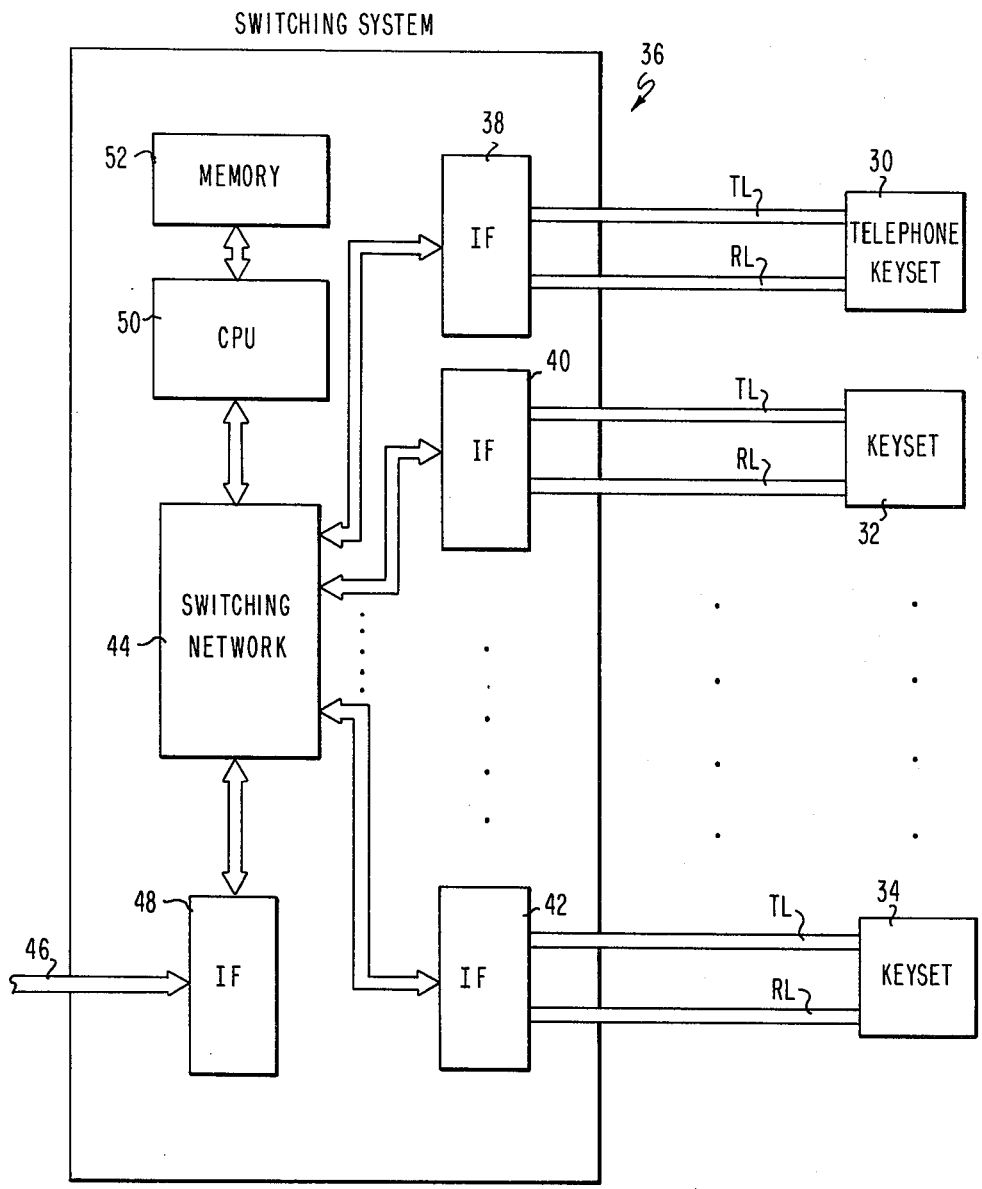
FIG. 3 is a block diagram of a telephone keyset system to which the present invention relates.

FIG. 3 illustrates, in block form, a telephone system of the type to which the present invention relates. This telephone system comprises a number of telephone keyset instruments 30, 32 and 34 connected to a switching system 36.

The telephone switching system 36 comprises an interface 38 which is the operative mirror image of the line interface components in the telephone keyset apparatus up to and including the keyset transceiver. Other similar or identical interfaces, such as interfaces 40 and 42, are provided in the switching system for connection to other similar or identical telephone keyset apparatus, such as the apparatus 32 and 34, respectively. The interfaces 38, 40 and 42 are each and all connected to a switching network 44 which, in turn, is connected to incoming trunk lines 46 via another interface 48. The switching network is controlled by a switching system computer comprising a CPU 50 and a memory 52. The CPU operates with software and data stored in the memory 52 to monitor and control the connections between the incoming lines 46 and the respective keyset apparatus.

With the exception of the interfaces 38-42, which are identical or similar to the corresponding respective interfaces of the telephone keyset apparatus connected thereto, the switching system may comprise a conventional private automatic branch exchange (PABX) for pulse code modulation (PCM) voice transmission. Consequently, the description below will be limited to one particular telephone keyset apparatus which is adapted for full duplex, digital communication with the switching system 36. While this keyset apparatus may be unique, it will be understood that the "I-USE" feature according to the invention may be implemented with other keyset apparatus as well and is not restricted for use with this apparatus alone.

Figure 4B:
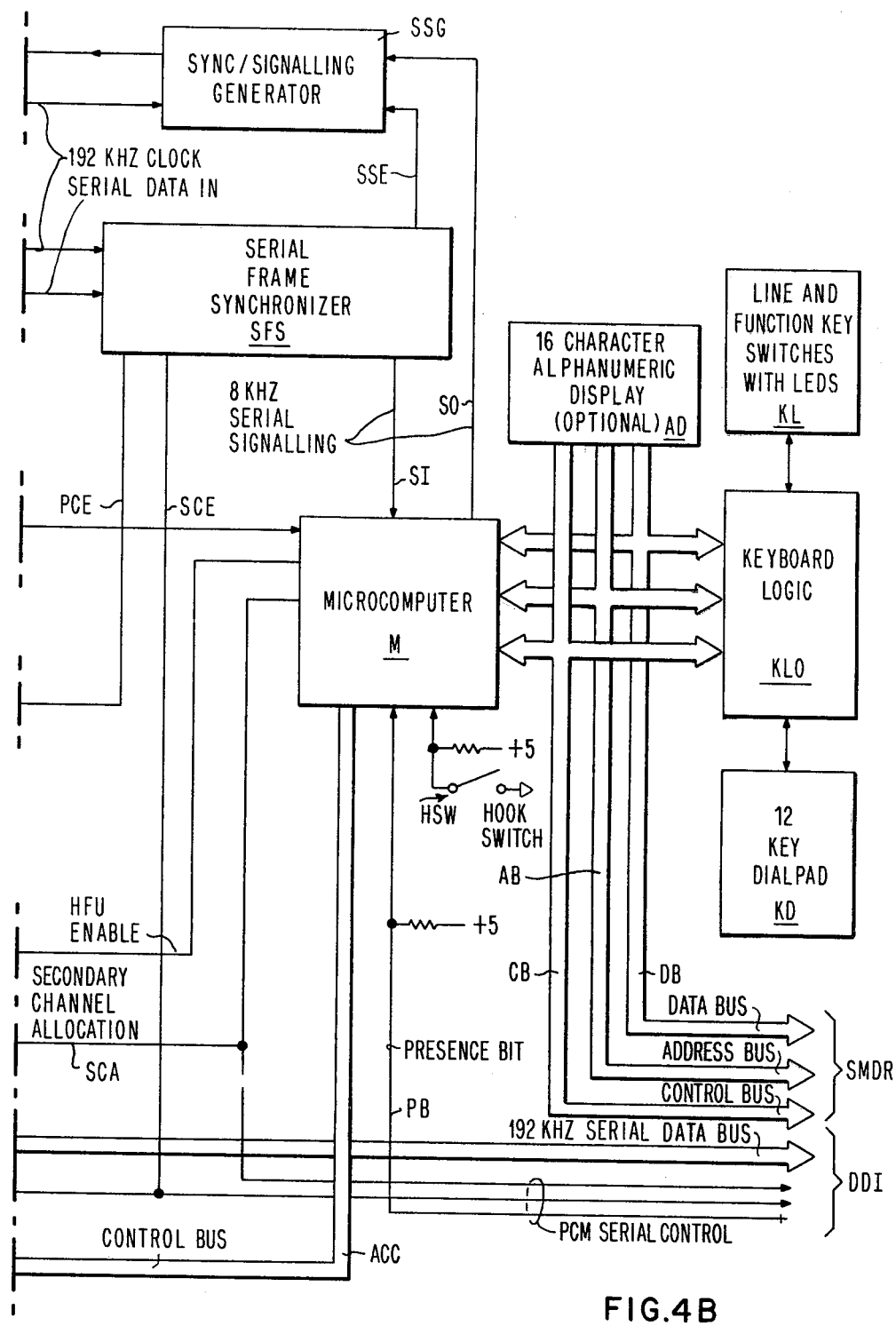

Telephone Keyset Apparatus (FIG. 4)

FIG. 4 shows a telephone keyset apparatus which may be connected to the switching system of FIG. 3. This apparatus may, in turn, be connected to additional peripheral, optional equipment (not shown) such as a digital data interface DDI or a subscriber message detailed recording printer SMDR. The telephone keyset apparatus is connected for duplex communications with the telephone transmission line TL/RL. The transmission line TL/RL is connected with windings I and II of transformers TR1 and TR1'. These transformers provide a phantom pair of wires, which is connected with a DC/DC power supply converter DCC. This converter receives direct current from the transmission line and generates the different DC voltages needed for the apparatus.

Secondary windings III and IV of transformer TR1 and TR1' are connected with a digital transmitter/receiver or "transceiver" DTR. The two wire pair TL of the transmission line are the transmitting wires; the two wire pair RL of the transmission line are the receiving wires. The transceiver DTR simultaneously transmits on the line TL and receives from the line RL a plurality of different data words which are arranged in a prescribed three-word frame format, described hereinbelow, and encoded with alternate mark inversion.

The transceiver DTR converts the alternate mark inversion encoded signal received from the transmission line RL into a 192 KHz clock as well as a serial data stream, herein called "serial data in". The transceiver also converts a data stream called "serial data out" from the telephone apparatus into an alternate mark inverted encoded signal for transmission on the line TL.

The 192 KHz clock signal is passed via an internal, serial data bus IB to a sync/signal generator SSG, a serial frame synchronizer SFS, a primary codec/PCM filter PCF, a secondary codec/PCM filter SCF and at least one peripheral system, for example, the digital data interface DDI of a digital computer or the like. Serial data received from the transmission line RL is passed via the internal data bus IB to the serial frame synchronizer SFS, the primary codec/PCM filter PCF, the secondary codec/PCM filter SCF and the peripheral system DDI. The digital transceiver DTR receives a serial data stream, for transmission onto the transmission line TL, via the internal data bus IB from the sync/signal generator SSG, the primary codec/PCM filter PCF, the secondary codec/PCM filter SCF and the peripheral system DDI.

The serial frame synchronizer SFS detects from the received serial data the synchronizing code and the signalling bit or bits, which are transmitted in one word of the frame format, so as to synchronize the different time slots of a frame format in time. The serial frame synchronizer generates three enabling signals in synchronism with the three eight-bit words or bytes of each frame format: sync/signalling enable SSE, primary channel enable PCE, and secondary channel enable SCE. The signal SSE is passed to the sync/signalling generator SSG which generates a word (byte) comprising a seven bit synchronization code and a single signalling bit received from the microcomputer M via the signalling output line 50. Upon receipt of the signal SSE, the sync/signalling generator passes this word out on the serial data out line of the internal bus to the digital transceiver DTR.

The signal PCE is passed to the microcomputer M and to the primary codec/PCM filter PCF. The rising edge of the signal PCE informs the microcomputer to look for a signalling bit on the signalling input line SI. The signal PCE also enables the primary codec/PCM filter PCF to receive and transmit on the serial data in and serial data out lines, respectively.

The signal SCE enables the secondary codec/PCM filter SCF and/or the digital data interface DDI for transmission of serial data to and from these units. Selection of one of these units is made by the microcomputer M via a secondary channel allocation signal SCA. The digital data interface requests access to the secondary channel via a presence bit PB.

Both the microphone and the receiver of the handset as well as the microphone and the loudspeaker of the speakerphone or "hands free unit" are connectable by means of microcomputer-controlled switches with either one (but only one) of the two codec/PCM filters PCF and SCF. These switches belong to the voice grade analog circuit VAC which is controlled by the microcomputer M via an analog configuration control bus ACC. Normally there is no hands free feature in the telephone apparatus because the optional hands free circuit board HO is needed. If added, this hands free circuit board HO is enabled by a signal "HFU enable" from the microcomputer and will only be used in connection with one of the two codec/PCM filters. The hands free circuit selects for transmission the voice of the loudest speaker. It may be a conventional unit and will not be described herein because it forms no part of the present invention.

If one of the codec/PCM filters is connected with the telephone handset for transmitting and receiving of one word of the frame format, thus transmitting and receiving on one channel, a peripheral system, for example the digital data interface DDI, may be enabled to transmit on the other channel. As will be pointed out below, the three-word, two-channel frame format permits the multiplexing of both voice and data, or voice and voice.

In addition to these connections the telephone apparatus may hold a connection with an external subscriber via one codec/PCM filter and, in response to a signal from the subscriber, can make a call back connection via the second codec/PCM filter; that is, via a separate data word or channel of the frame format. In this case the first connection will be disconnected by the voice grade analog circuit VAC and the second connection will be established via the second codec/PCM filter and the voice grade analog circuit.

Thus the two channel frame format permits the telephone apparatus to support two different telecommunication connections simultaneously. For example, one connection may be made with another telephone subscriber for a voice communications while another connection is made with a data system for the transmission of digital data. Alternatively, the telephone apparatus may support a first subscriber to subscriber connection for normal voice communication plus a second subscriber to subscriber connection in a call back function.

As noted above, the microcomputer M controls the switching of the voice grade analog circuit VAC and the hands free circuit HO via the analog configuration control bus ACC and the control ine "HFU enable", respectively. Furthermore, the microcomputer M controls the use of the second channel in the PCM frame via the secondary channel allocation line SCA. In this way, a peripheral data system connected to the digital data interface DDI may transmit and receive data via the telephone transmission line TL/RL.

However, the microcomputer has other functions as well. All the data which are transmitted and received over the internal data bus IB are fast data signals: In this embodiment, one word or byte per channel is transmitted every 125 microseconds. As will be explained below, the frame format also supports the transmission of slower data which are needed to perform such functions as setting characters in a numeric display, illuminating LEDs, transmitting operational commands and the like. This slower data is transmitted at a rate of 1 bit per 125 microsecond frame or 8 KHz. This bit, the so-called "signalling" bit, is serially received by the microcomputer M and successive bits are assembled into bytes. For reasons which will be explained below, one byte is assembled every 4 milliseconds for a byte rate of 250 Hz.

Simultaneously with the receipt of signalling bits the microcomputer M transmits signalling bits at the same 8 KHz rate on the output line SO. This enables the microcomputer to conduct a signalling dialog with the switching system 36 at the other end of the telephone transmission line TL/RL.

In addition to the signalling input and output on lines SI and SO, respectively, the microcomputer is coupled to I/O devices such as an alphanumeric display AD, a special message detailed recording printer SMDR and two keyboards KL and KD. The keyboards KL and KD are interfaced to the microcomputer via a keyboard logic KLO. The display, keyboards and printer are connected to the microcomputer via a common data bus DB, address bus AB and control bus CB. These I/O devices are thus addressed and controlled by the microcomputer M and transmit or receive data to and from the microcomputer in the conventional manner. Additional I/O devices may also be connected to the microcomputer via the data, address and control busses.

The alphanumeric display AD may be a 16 character liquid crystal display for informing the operator of the telephone apparatus of telephone numbers, names and other messages. The keyboard KL comprises the line keys 16 for selecting and indicating one of a number of telephone lines to which the telephone apparatus is connected and the function keys 18 for selecting and indicating functions such as "HOLD", and "I-USE". As indicated previously, both the line and function keys carry LEDs to indicate their operation.

The key dialpad KD may or may not be provided with LEDs on each of the dial keys 14. In addition to phone numbers the dialpad KD may be used to input numerical information to the microcomputer if the latter is programmed for use as a calculator, for example.

In addition to the I/O devices referred to above, the microcomputer M is also connected to the telephone hook switch HSW and is thus informed whether the telephone apparatus is in the "on-hook" or "off-hook" condition.

The microcomputer M may be any commercially available single chip computer which is sufficiently fast and has sufficient ROM and RAM capacity to accomplish the necessary tasks. A suitable microcomputer for this purpose is the Intel 8049.

The software or firmware for the microcomputer M will depend upon the functions the microcomputer is intended to execute. Typical commands for the microcomputer which may be received from the switching system 36 via signalling bits on the line SI and assembled into 8-bit signalling bytes are:
1. Ring (or beep) the telephone apparatus;
2. Select type of ring;
3. Flash an LED;
4. Select the LED (to be flashed);
5. Turn on an LED;
6. Select the LED (to be turned on);
7. Turn-off an LED;
8. Select the LED (to be turned off).

Each of the above commands are defined by one byte. Note that two successive bytes are used for a complete signalling message.

Typical signalling bytes which are sent from the microcomputer to the switching system define on-hook and off-hook conditions and indicate the selection of line, function and dial keys by the operator.

Frame format (FIGS. 5,6)

FIG. 5 shows an example of a frame format which may be used in the telephone apparatus described above in connection with FIG. 4. This example illustrates that, in principle, there exists no limitation on the number of PCM words in a frame. The number of words depends only upon the data rate used in this system. Obviously the data rate in kilobits per second (KB/sec.) must be matched to the needed speed in the telephone system to which the telephone apparatus is connected. In particular, the frame pattern must be synchronous with the PCM frame timing. In the described system, a multiple of the standard 8 KHz sampling rate is used.

Given the 8 KHz sampling rate—that is, one sample every 125 microseconds—the number of words (samples) in each frame and the number of bits per word (sample) determines the frequency of the data pulses. Conventionally, each sample is defined by 8 bits or a byte of information. In the preferred embodiment of the present invention the number of samples per frame is two.

Clearly, there is an upper limit to the frequency with which digital pulses may be transmitted to and from, and processed by the telephone apparatus. In particular, this upper limit is defined by the nature and length of the transmission line and the speed of the individual components of the telephone apparatus such as the transceiver, the synchronizer and, especially, the microcomputer. The telephone apparatus according to the present invention is designed for use with a 4,000 foot cable comprising two conventional twisted pairs of wires.

The standard PCM data rate of 64 KB/sec. (that is, the 8 KHz sampling rate times 8 bits per sample) set the lower limit on the data rate of the telephone apparatus according to the invention. In addition to the PCM data it is necessary to transmit both synchronization and signalling information. Finally, if permitted by the maximum data rate, it is desirable to transmit at least one additional PCM voice or serial data stream.

In the present embodiment the telephone apparatus simultaneously transmits and receives one "frame" of information every 125 microseconds; that is, the standard PCM sampling rate for telephone systems. Each signal frame is divided into at least two equal, 8-bit time slots: one time slot for the synchronization and signalling information and at least one, but preferably two time slots for separate, independent channels carrying PCM voice data and/or digital data. With three time slots, the data rate is 3×64 KB/sec. or 192 KB/sec.

FIG. 5 shows the 125 microsecond frame divided into the three time slots. The three enable signals—sync/signalling enable SSE, primary channel enable PCE, and secondary channel enable SCE—are also shown to indicate their time relationship with the first, second and third words of the frame respectively.

The first seven bits (B8-B2) of the first word are set at the synchronizing code, which is preferably, alternately 0011011 and its inverse 1100100. The 8th bit (B1) in the first word, designated "S", is successively a start bit, one of 8 signalling bits and one of 23 stop bits.

The second word of the frame contains a single PCM speech sample of 8 bits (1 byte). The third word may contain either a PCM speech sample or a digital data word of 8 bits (1 byte). These second and third words are transmitted via the internal data bus IB of the telephone apparatus between the transceiver DTR and the primary codec/PCM filter (for the second word) and the secondary codec PCM filter or the DDI (for the third word).

It will be understood that the frame format may comprise only the first two words, or it may comprise more than three words, thus correspondingly increasing the number of transmission channels. If only two words are provided, the data rate will be 2×64 KB/sec. or 128 KB/sec. If more than three words are provided, the data rate must be correspondingly increased to permit transmission on each channel at the 64 KB/sec. rate.

FIG. 6 shows a "superframe" of 32 frames, each identical to the frame shown in FIG. 5. Each superframe has a transmission time of 4 milliseconds.

The first frame F1 of the superframe contains a start bit or "0" in the B1 bit position of the first word. The next 8 frames contain the signalling bits S1,S2 ... S8 in this bit position. The following 23 frames contain stop bits, or a "1", in the B1 bit position. With this arrangement, one signalling byte is transmitted to and from the microcomputer every four milliseconds. During the time that the frames F10-F32 are transmitted and received, the microcomputer has time to control other functions of the telephone apparatus.

As will be appreciated from the discussion above, the frame format according to the invention facilitates the transmission of two or more independent and simultaneous voice and/or data channels within one PCM frame and without any buffering. Consequently this format makes possible the provision of additional features, such as additional connections to peripheral units, without any change in the existing telecommunication system.

The frame format according to the invention also permits the extraction of a clock signal from the data information with no phase jitter thus allowing coherent operation between facilities.

Finally, the frame format provided optimises bandwidth for digital data transmission and alleviates out-of-band radio interference.

Figure 7:
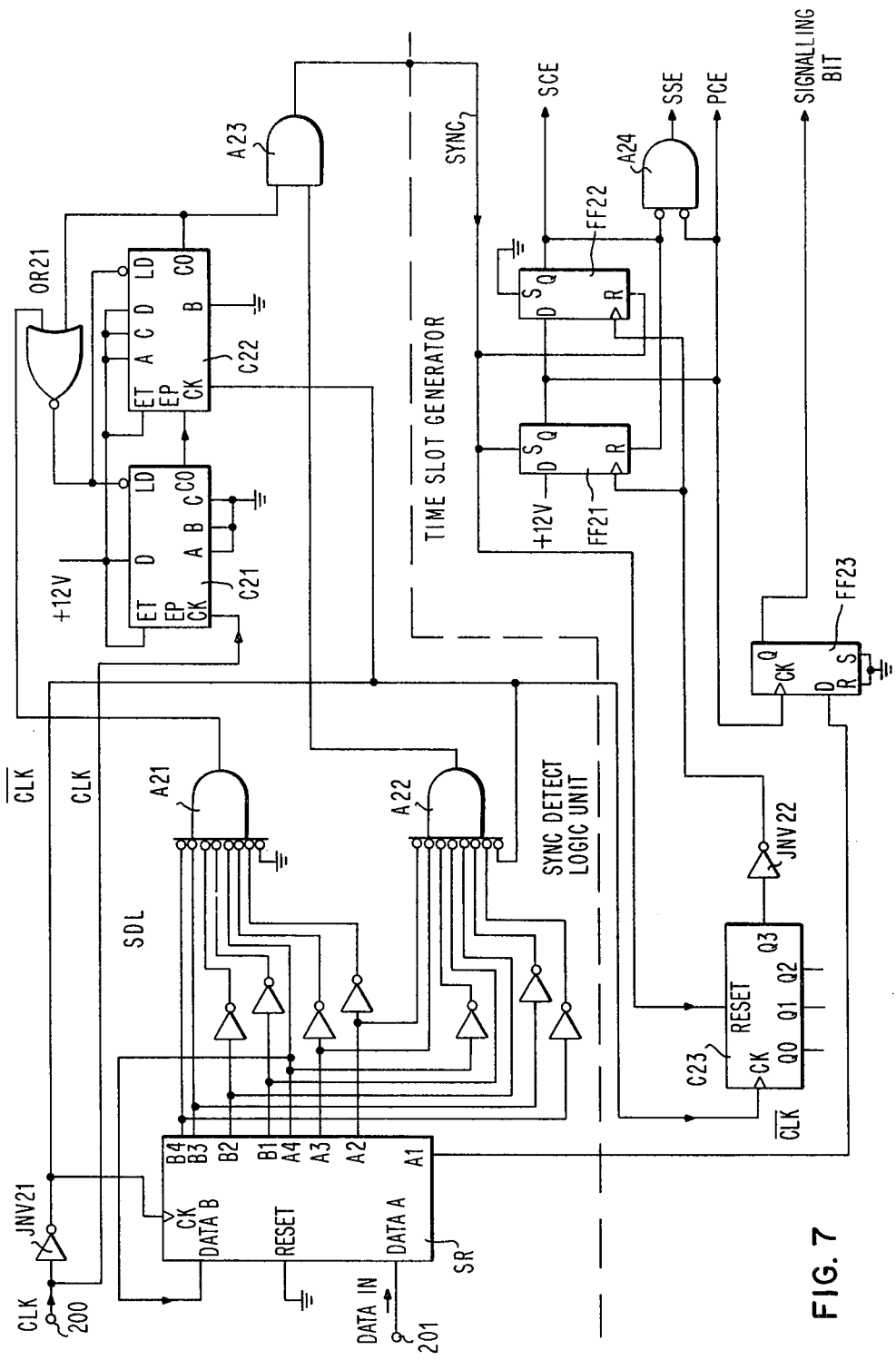
FIG. 7 is a schematic diagram of the serial frame synchronizer shown in FIG. 4.
Figure 8:
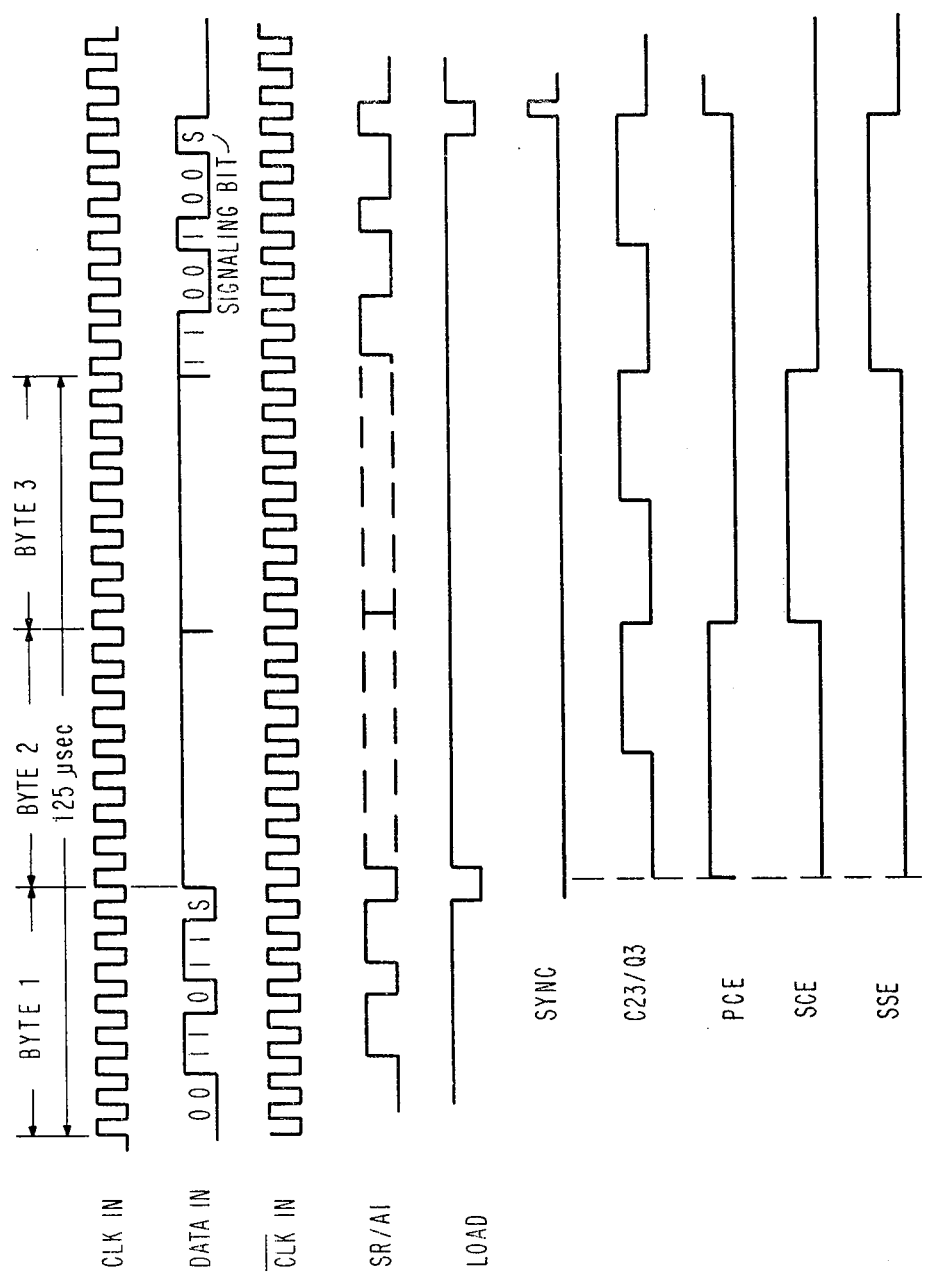
FIG. 8 is a timing diagram of a number of signals appearing in the serial frame synchronizer shown in FIG. 7.

Serial Frame Synchronizer SFS (FIGS. 7,8)

It has been pointed out that the serial data rate, employed in the telephone keyset apparatus of FIG. 4, is 192 Kbit/sec. With reference to FIGS. 5 and 6, it has been described that each serial data frame format includes three bytes, each comprising eight bits. In each frame format one of these bytes has the characteristic of the synchronizing/signalling byte composed of seven synchronizing bits and a signalling bit.

By means of the synchronizing bit, the frame formats of a continuous serial data stream can be detected by the serial frame synchronizer SFS. By evaluating the time of the occurrence of the synchronizing bits within the serial data stream the three bytes of a frame format which are generated and transmitted independently of each other are identified. For this reason the seven bit code which consists of the synchronizing bits has to have very low correlation with any encoded data information; neither normal data information nor an idle channel code. Statistical studies have proved that the bit series of 0011011 does follow these requirements. Accordingly, the inverted synchronizing bit code comprises of the series 1100100.

The serial frame synchronizer is mainly composed of three sub-units, a serial-to-parallel converter for converting the information received at the serial data stream into a parallel 8-bit format, a logic unit for continuously evaluating the current state of the serial-to-parallel converter and a time slot generator for producing under control of a synchronizing pulse three output signals each occurring concurrently with a respective one of the three bytes of a frame.

As seen in FIG. 4, the serial frame synchronizer SFS receives a 192 KHz clock at a clock input 200 and serial data at a data input 201. Forming the serial-to-parallel converter in the serial frame synchronizer SFS there is arranged a shift register SR. The shift register SR is implemented as a double four-bit shift register with two corresponding serial data inputs DATA A and DATA B, respectively and two sets of four parallel outputs A1 through A4 and B1 through B4. These two four-bit shift registers are cascaded by short-circuiting the most significant output A4 of the first stage with the second serial data input DATA B. The first serial data input DATA A is connected to the data input 201 of the serial frame synchronizer SFS. The operation of the shift register SR is controlled by clock signals $\overline{CLK}$ which are inverted by an inverter I21 with respect to the clock signal pulse train CLK supplied to the clock pulse input 200. For detecting the seven synchronizing bits of a frame format there is arranged the synchronizing detect logic unit at the output of the shift register SR. It comprises a straightforward logical network composed of a series of inverters and two AND-gates A21 and A22. Each of the inverted inputs of the AND-gates is coupled to a respective one of the most significant parallel outputs A2 through A4 and B1 through B4 of the shift register SR either directly or by one of the inverters. The AND-gates A21 and A22 thus are all zero detectors and are alternatively supposed to be operative if the current state of the shift register SR reflects either the normal or the inverted synchronizing bit pattern.

It has been described hereinbefore that consecutive frames have the characteristic that alternatively a normal and the inverted synchronizing bit pattern occurs. For fail-safe operation, it is now evaluated that for two consecutive frames both the normal and the inverted synchronizing bit pattern occur within a given distance determined by the data frame format. This is achieved by counting the clock pulses occurring after having detected one of the synchronizing bit patterns and by evaluating the status of the shift register SR one pulse frame later if then the inverse synchronizing bit pattern is present.

To perform this operation there is arranged a 24-bit counter in accordance with the chosen frame format which is implemented by means of two cascaded 16-bit counters C21 and C22. The first counter C21 is controlled by the 192 KHz clock signal CLK received at the clock pulse input 200 of the serial frame synchronizer SFS. It produces a carry output signal at its carry output CO when the maximum count is reached. This output signal is fed as a count-enable signal to a count enable input EP of the second counter C22 which is controlled by the inverted clock pulses $\overline{CLK}$. Both counters are preset in common to a predetermined starting count by a preset signal applied in parallel to their load inputs LD. This preset signal is generated at the output of an OR-gate OR21 having two inputs each connected to a respective one of the outputs of the first AND-gate A21 and the carry output CO of the second counter C22. Thus, an output signal at the carry output CO of the second counter C22 occurs whenever 24 bits of the 192 KHz clock pulse train have passed. In other words, the signal condition of the first AND-gate A21 detecting a synchronizing bit pattern is buffered for exactly one pulse frame and then appears at the carry output CO of the second counter C22.

At this time, the second AND-gate A22 of the synchronizing detector logic unit is supposed to carry a signal of signal level "1", if the bit pattern occurring one pulse frame earlier in fact was a synchronizing bit pattern. The signals occurring at the carry output CO of the second counter C22 and the second AND-gate A22 are logically linked by a further AND-gate A23 which produces an output signal of signal level "1" occurring exactly once after each series of 48 pulses of the 192 KHz clock pulse train CLK. This output signal of the AND-gate A23 is the synchronizing signal SYNC locking the serial data stream to the correct frame format.

The described circuit is implemented with a minimum of hardware and has a very high noise immunity. Once both synchronizing bits in form of the output signals of the AND-gates A21 and A22 are detected, the circuit remains locked with these synchronizing bits. The only time that the circuit may lose synchronization is when the synchronizing signal is slipped. But any noise associated with the synchronizing bits will not cause the circuit to loose synchronization once the synchronized status is detected.

The synchronizing signal SYNC controls the time slot generator for locating the three different bytes in a frame by means of the three timing signals "Synchronizing/Signalling Enable" SSE, "Primary Channel Enable" PCE, and "Secondary Channel Enable" SCE. Each of these signals occurs one after the other and specifies during its signal level "1" a time period for the occurrence of a respective one of the three bytes of a frame.

For obtaining this operation the time slot generator is provided with a further 8-bit counter C23 which receives the inverted clock pulses $\overline{CLK}$ at its clock input. The counter is designed as a divide-by-eight counter and produces at its Q3 output a 24 KHz pulse train which is inverted by a further inverter I22 and, in common, applied to clock inputs of two further D flip-flops FF21 and FF22. A Q-output of the first flip-flop FF21 of the time slot generator is connected to the D-input of the second flip-flop FF22. The Q-output of the second flip-flop FF22 is connected to the reset input of the first flip-flop FF21 of the time slot generator. Thus, resetting of the first flip-flop FF21 is accomplished whenever the second flip-flop FF22 is set.

As will be explained in the following, the first flip-flop FF21 in its set condition generates the primary channel enable signal PCE whereas the second flip-flop FF22 in its set condition carries the secondary channel enable signal at its Q-output. Both signals are applied to a respective one of the inverted inputs of a further AND-gate A24 which is operative if both the primary channel enable signal PCE and the secondary channel enable signal SCE are at signal level "0". Thus, the output signal of this further AND-gate A24 generates the sync/signalling enable signal SSE.

In the time slot generator there is provided a further D flip-flop FF23 having a data input D connected to the least significant output A1 of the shift register SR and a clock input which is connected to the Q-output of the first flip-flop FF21 of the time slot geneator. The D flip-flop FF23 operates as a synchronizer for detecting the signalling bit which is present at the least significant output of the shift register at a time concurrently with the rising edge of the primary channel enable signal PCE.

The operation of the serial frame synchronizer which implementation has been described hereinbefore will now be pointed out with reference to various timing signals shown in FIG. 8. The first line represents the 192 KHz clock pulse train CLK as applied at the clock input 200 to the serial frame synchronizer SFS. The stream of serially incoming data which is received at the data input 201 of the serial frame synchronizer is shown in the second line of FIG. 8. In the left hand and the right hand margin of this pulse train is assumed that two consecutive patterns of synchronizing bits appear. Derived from this signal condition, the alignment of the frames is indicated on top of FIG. 8. The third line of FIG. 8 shows the wave form of the clock pulse train in inverted form which is referenced as $\overline{CLK}$.

These three pulse trains form the input signals of the serial frame synchronizer SFS from which signals all the remaining wave forms shown in FIG. 8 are derived. The fourth line of FIG. 8 represents the operation of the shift register SR by means of the output signal occurring at the least significant output A1 of the shift register SR. As to be seen from comparison with the data stream shown in line 2, the output pulses have a delay of half the bit time which is resulting from controlling the shift register SR by the inverted clock pulses $\overline{CLK}$. In the fourth line there is shown the timing of the load pulses applied to the counters C21 and C22 which pulses are produced at the output of the OR-gate OR21. These signals occur if the signal pattern at the most significant outputs A2 through A4 and B1 through B4 of the shift register SR reflects the synchronizing bit pattern. The signals also can be determined by the carry output signal of the second counter C22 of the serial frame synchronizer. These signals occur in a synchronized mode of operation every 24 bits of the inverted clock pulse train $\overline{CLK}$.

The sixth line shows the timing of the synchronizing bit SYNC which is identical with the output signal of the AND-gate A23. This signal is applied to both a reset input of the third counter C23 and the set input of the first D flip-flop FF21 of the time slot generator. Thus, the third counter C23 is reset to zero and will carry an output signal at its Q3-output eight clock pulses later. At the same time the first D flip-flop FF21 is set thereby generating at its Q-output the primary channel enable signal PCE. The next "1" to "0" transition of the output signal of the third counter C23 enables the second flip-flop FF22 of the time slot generator to load the data information applied to its data input D. The second flip-flop in its set condition generates the secondary channel enable signal SCE and a reset signal for the first flip-flop FF21. Thereby it is accomplished that the next following transition form "1" to "0" level of the output signal of the third counter C23 cannot reactivate the first flip-flop FF21, the status of which remains unchanged for two consecutive clock pulses.

The same clock pulse, however, which is blocked at the first flip-flop FF21 drives the second flip-flop FF22 into its reset state. Thereby, the secondary channel enable signal is turned off and furthermore the first flip-flop FF21 of the time slot generator becomes unlocked and can be set again by means of the following clock pulse. Since both flip-flops FF21 and FF22 are thus reset for a period of eight 192-KHz-clock pulses between the trailing edge of the secondary channel enable signal SCE and the rising edge of the primary channel enable signal PCE, the sync/signalling enable signal SSE will be generated at the output of the AND-gate A24. The timing of the three enable signals PCE, SCE and SSE may be obtained from lines 8–10 of FIG. 8.

Figure 9:
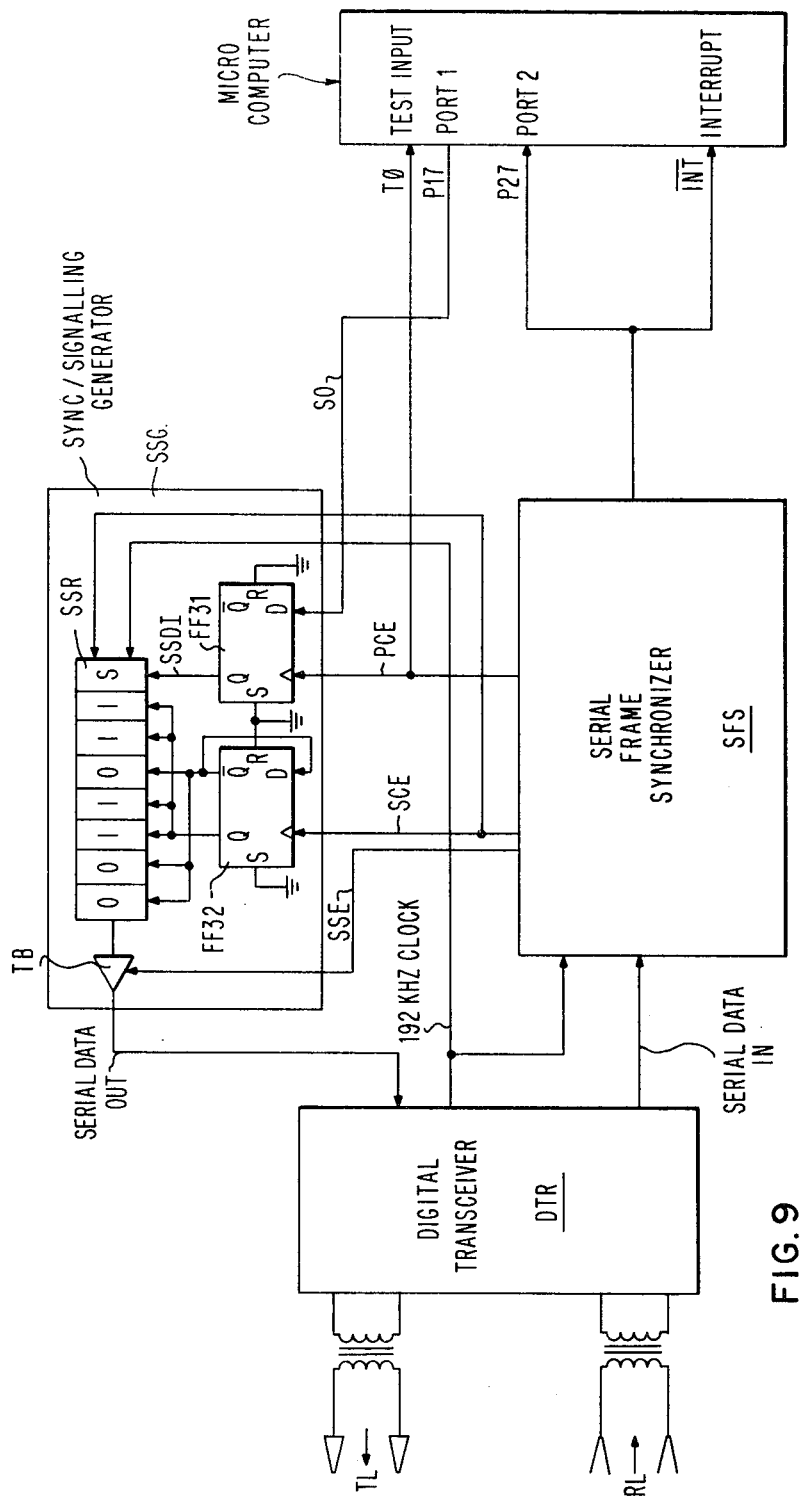
FIG. 9 is a schematic diagram of the sync/signalling generator shown in FIG. 4.
Figure 10:
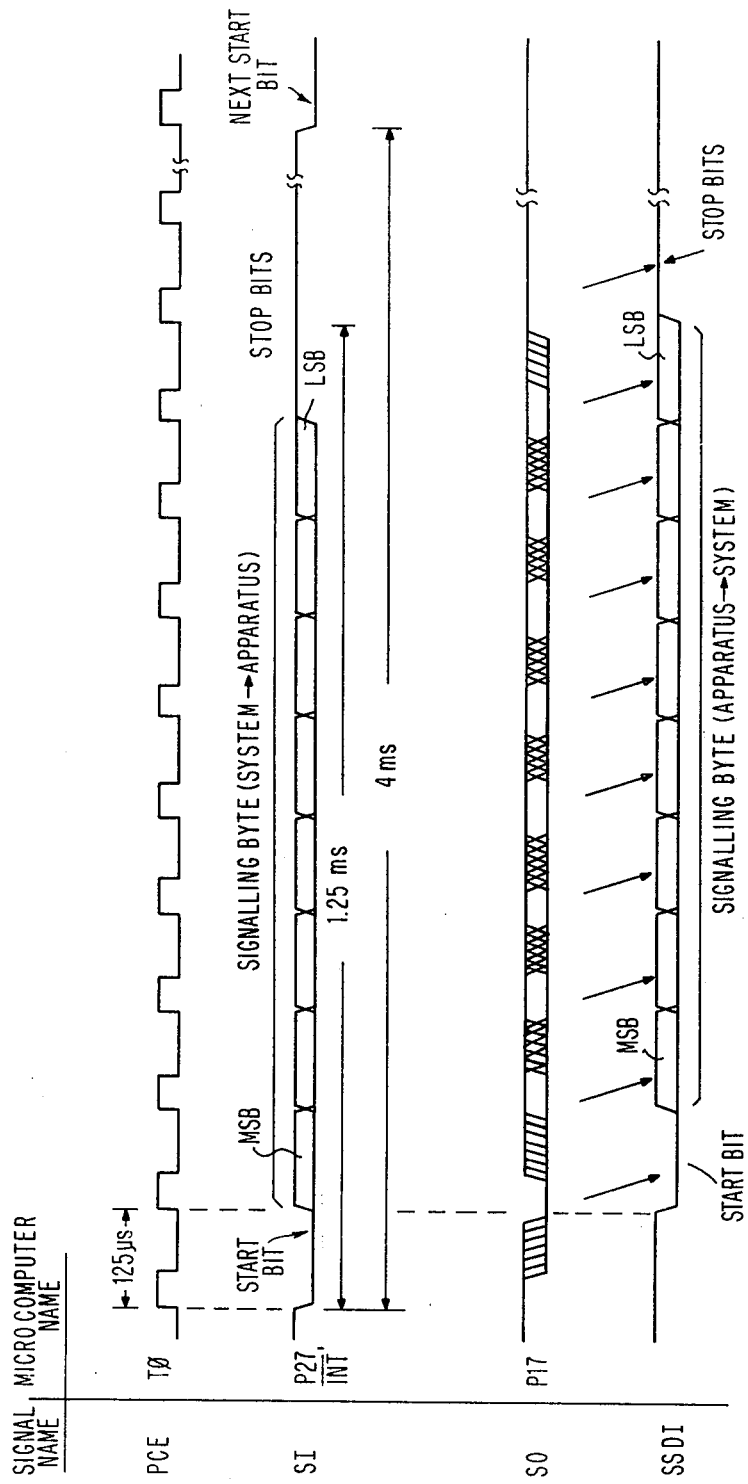
FIG. 10 is a timing diagram of a number of signals appearing in the sync/signalling generator of FIG. 9.

Sync/Signalling Generator (FIGS. 9 and 10)

The internal structure of the sync/signalling generator SSG, as well as its interrelationship with the digital transceiver DTR, serial frame synchronizer SFS and the microcomputer M is shown in FIG. 9. As noted above, the digital transceiver passes digital data in the prescribed frame format to the serial frame synchronizer SFS via the "serial data in" line of the internal data bus. The digital transceiver also receives digital data in this frame format via the "serial data out" line of the internal data bus for transmission on the telephone line TL. Finally, the digital transceiver generates a 192 KHz clock signal from the signals received from the transmission line RL. The 192 KHz clock is passed to both the sync/signalling generator SSG and the serial frame synchronizer SFS, as well as to other components of the digital telephone apparatus (not shown in FIG. 9).

The serial frame synchronizer SFS passes one bit of each 125 microsecond frame to both the P27 input port and the $\overline{\text{INT}}$ interrupt input of the microcomputer M. This bit appears in the B1 bit position of the first data word in the frame and may be a start bit, a signalling bit or a stop bit.

As explained previously, the serial frame synchronizer produces three enable signals: sync/signalling enable SSE, primary channel enable PCE and secondary channel enable SCE. These three signals are passed to the sync/signalling generator SSG. The signal PCE is also passed to the TO or "test input" port of the microcomputer M.

The microcomputer successively generates start, signalling and stop bits and passes these to the sync/signalling generator via its output port P17 and the line SO. These bits are successively latched into a flip-flop FF31 for subsequent insertion in the B1 bit position of a shift register SR via an input line SSKI. The synchronization code 0011011, and its inverse 1100100 are inserted in the SSE shift register SSR from the two outputs of a second flip-flop FF32. This second flip-flop is clocked once per frame by the secondary channel enable signal SCE. This flip-flop is configured to divide the SCE pulses by two so that it toggles upon receipt of each SCE pulse.

The shift register SSR also receives the secondary channel enable signal SCE. When this enable signal is present, the shift register may be loaded, and it will hold its contents without shifting. Upon termination of the SCE signal the shift register will shift its contents out at the 192 KHz clock rate via a tri-state buffer TB. This buffer is enabled by the sync/signalling enable signal SSE to pass the contents of the shift register SR to the "serial data out" line of the internal data bus. The tri-state buffer isolates the shift register from the "serial data out" line during the periods that the second data word and third data word of a frame are transmitted.

FIG. 10 shows the timing of the signals appearing on the lines in FIG. 9 for the period of 1 superframe (4 milliseconds). As is shown, the microcomputer M receives a start bit at its inputs P27 and $\overline{\text{INT}}$ coincident with the leading edge of the primary channel enable signal PCE. Similarly, a start bit appears at the output of the flip-flop FF31 on line SSDI upon appearance of the leading edge of the next subsequent pulse of the signal PCE. Thus, all the start, signalling and stop bits are received one 125 microsecond frame earlier by the microcomputer M than the bits passed to the shift register via the first flip-flop FF31, due to the single frame delay introduced by this flip-flop. The use of the flip-flop FF31 to store one bit for one frame period is necessary because the microcomputer is timed by the receipt of a bit and only thereafter does it send a bit out from its output port P17.

The microcomputer M initially establishes synchronism with the superframe by monitoring the bits appearing at its input P27 for 23 stop bits and a subsequent start bit. Once synchronism is established, the microcomputer disables its interrupt $\overline{\text{INT}}$ after receiving 8 successive signalling bits until shortly before it expects to receive the next start bit. In this way, the microcomputer will not be interrupted by a stop bit which is erroneously a "0" when it should be "1", so that it will continue to attend to its other functions as the stop bits are received. The microcomputer operates asynchronously from its own high frequency clock. Microcomputer software or firmware is used to determine the expected times of arrival of the pulses on line SI.

Since there is no handshake or echo operation in the communication between the telephone apparatus and the switching system 36 to which it is connected, there is a need for redundancy in the signalling information transmitted to avoid problems upon receipt of an incorrect signalling bit. An incorrect signalling bit can cause the telephone apparatus to function improperly not only during calls but also between calls, since the apparatus is continually "on" as long as it is connected.

Assuming a typical bit error rate of $1 \times 10^{-7}$ (1 incorrect bit out of every 10 million) a bit error would occur every:

$$\frac{10^7 \text{ bits}}{1 \text{ error}} \times \frac{1 \text{ Sec}}{192 \times 10^3 \text{ bits}} = 52.083 \text{ secs/error}$$

Assuming an equal probability of any of the three words comprising the 24 bit frame of being the word with the bit error, a bit error in the sync/signalling word (first word) would occur every:

$$\frac{52.083 \text{ secs}}{\text{bit error}} \times \frac{3 \text{ bytes}}{\text{frame}} = 156.25 \text{ secs/error}$$

This bit error rate may be increased to an order of magnitude of years per error by sending each signalling word (byte) to the microcomputer 3 successive times. The microcomputer then compares the three bytes, bit by bit, and responds to a signalling command only if at least two of the three bytes are equal. Thus, the microcomputer responds to the majority vote of the signalling bytes.

Figure 11B:
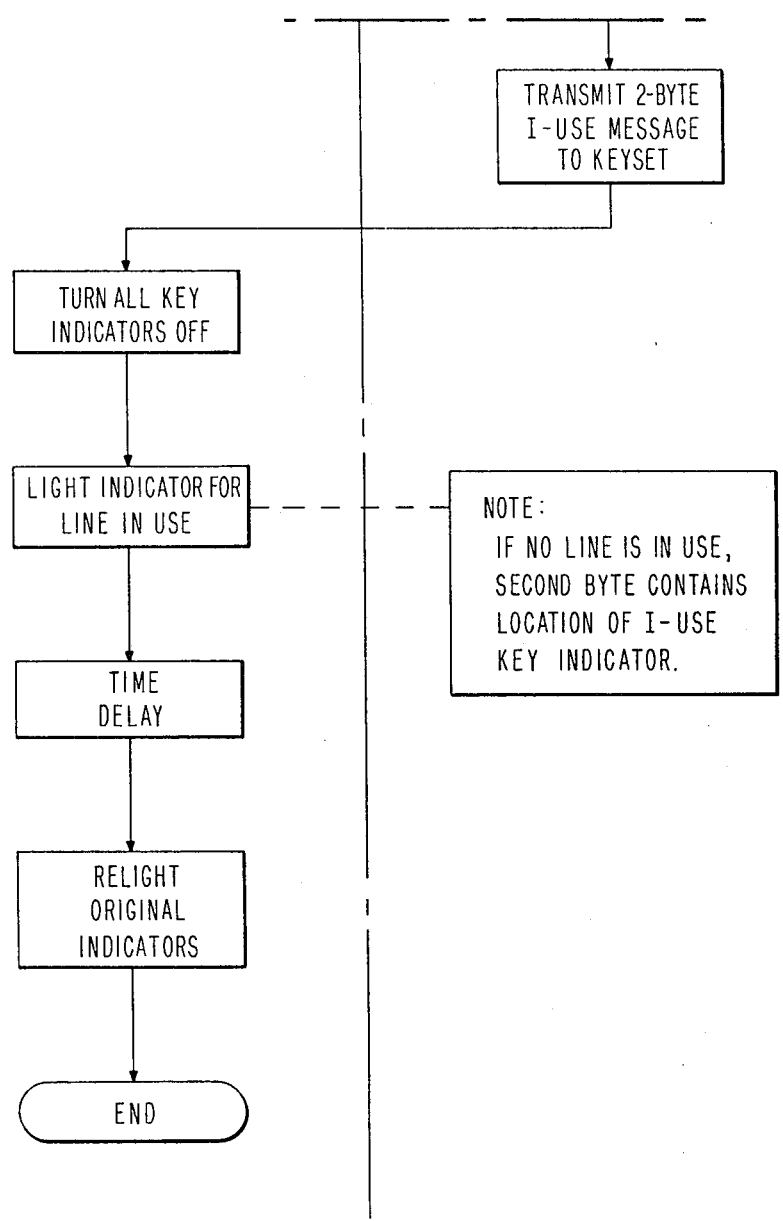
Figure 12A:
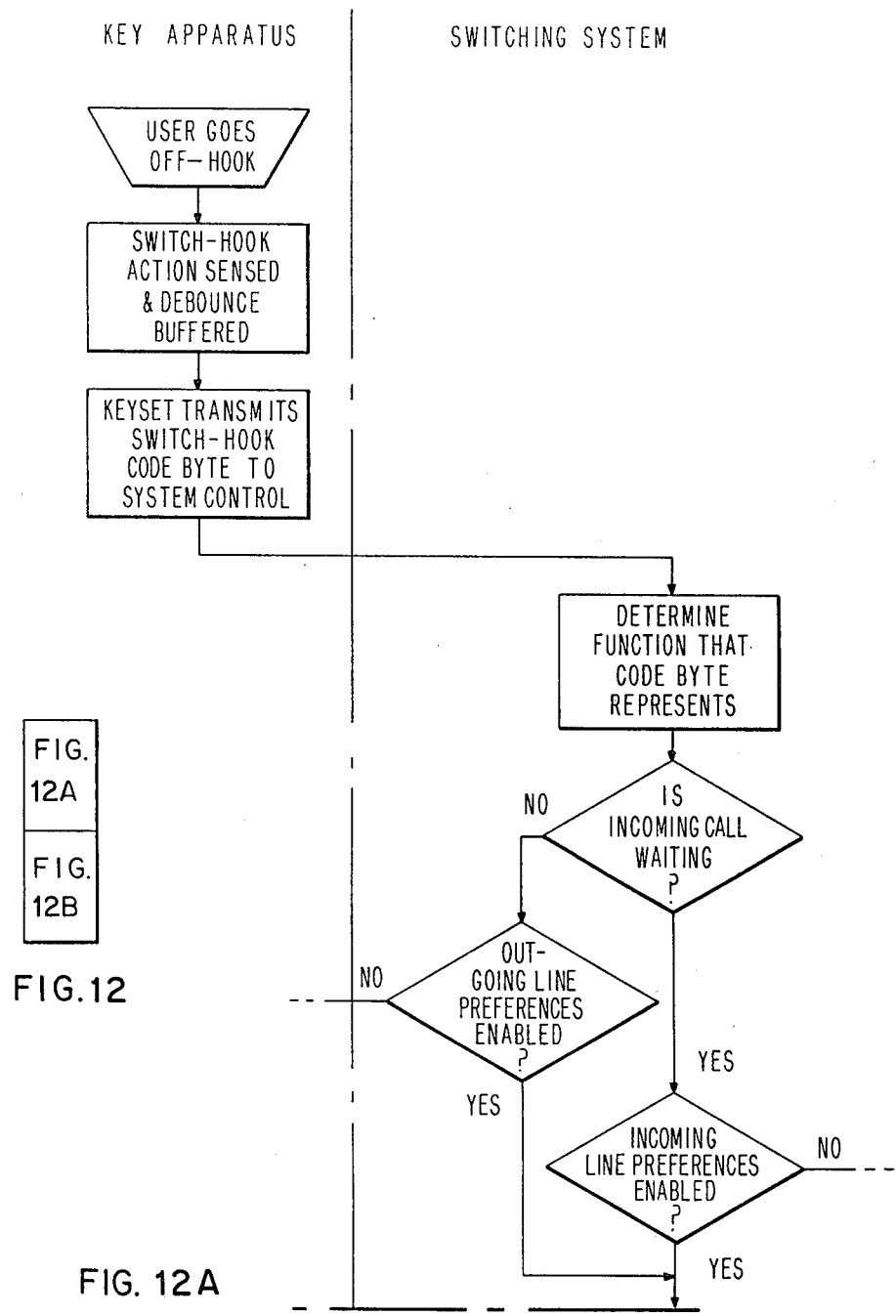
FIGS. 12A and 12B when arranged as shown in FIG. 12 illustrate a flow chart detailing the operation of another preferred embodiment of the present invention.
Figure 12B:
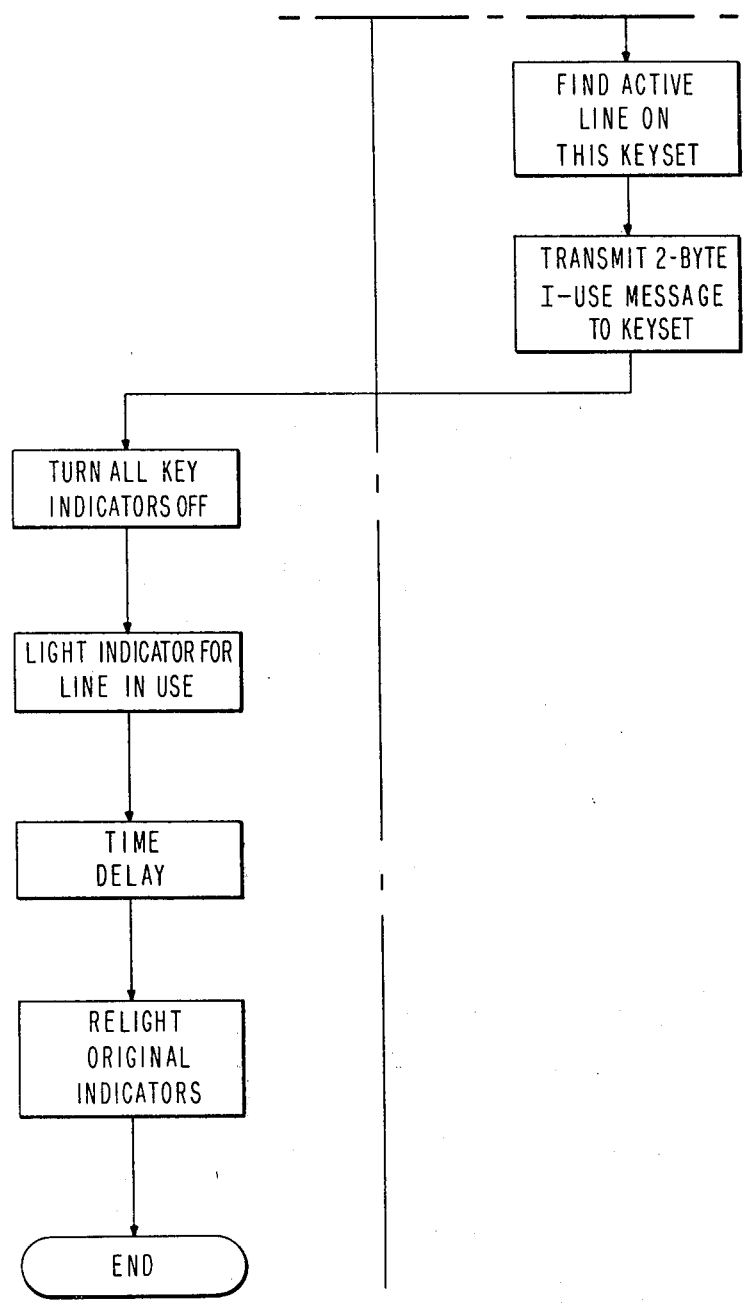

"I-USE" Function (FIGS. 11 and 12)

The "I-USE" feature according to the invention is implemented via a combination of telephone keyset apparatus firmware and switching system software. The algorithms for the two embodiments of this feature are illustrated by flow chart in FIGS. 11 and 12.

When the keyset I-USE function key is depressed, the keyset microcomputer M detects the keystroke via scanning by the keyboard logic KLO and buffers it in its memory. After having established that this is a valid keystroke, the microcomputer, through firmware logic, generates the 8-bit signalling byte used to represent this keystroke. Under firmware control, this signalling byte is transmitted to the switching system computer 50 in the manner described above.

The switching system computer 50 maintains in its memory 52 a keyset key map which relates 8-bit signalling bytes to functions. Thus, the switching system computer is able to ascertain that the particular keyset which sent this specific 8-bit combination is invoking the I-USE feature.

Using software logic, the switching system computer 50 consults the switching network map and determines which line is presently active on the particular keyset involved. It then prepares a two-byte signalling message which it sends to the specific telephone keyset apparatus. The first byte of the message identifies it as an I-USE message while the second byte identifies the location of the active line on the telephone apparatus.

The microcomputer M of the telephone apparatus decodes this message from the switching system 36 and causes all visual line indicators 26 (LEDs) on the line keys 16 to go dark. It then lights the indicator corresponding to the line specified in the second byte of the message. The time interval during which this unique display presentation persists is preset via firmware controllable timing. Following this interval, the microcomputer M restores the appropriate status of all visual line indicators. The switching system computer 50 can update the status of these line indicators by sending appropriate signalling messages during the I-USE function. Thus, the new status of these indicators will not be apparent until all indicators are again reactivated at the conclusion of the I-USE timing interval.

For telephone keyset apparatus which is programmed to invoke the I-USE function automatically in conjunction with incoming and/or outgoing automatic line preferences, the switching system computer 50, via software logic, transmits the two-byte I-USE message in response to a hook-switch off-hook code byte message from the telephone apparatus (i.e., in addition to a normal I-USE function key signalling byte) as shown in FIG. 12. Thus, the I-USE function may be invoked via two separate triggering mechanisms.

There has thus been shown and described a novel feature for a telephone keyset apparatus which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Telephone keyset apparatus comprising in combination:
(a) a plurality of dialing keys for dialing a telephone number;
(b) a plurality of line keys, each associated with a single telephone line, for selecting the associated telephone line;
(c) a plurality of first indicator lamps, each associated with one of said line keys, for indicating, when illuminated, that its associated telephone line is in use;
(d) at least one function key for selecting a function to be performed by the telephone keyset apparatus; and
(e) means responsive to the operation of said one function key for turning off all of said first indictor lamps with the exception of that one first indicator lamp associated with that telephone line to which the telephone keyset apparatus is currently connected.

2. The apparatus recited in claim 1, wherein means (e) is further operative to relight all of said first indicator lamps that have been turned off after a predetermined time interval.

3. The apparatus recited in claim 2, wherein said interval is in the range of one to five seconds.

4. The apparatus recited in claim 1, wherein means (e) is operative to turn off all of said first indicator lamps, with the exception of said one first indicator lamp, when said one function key is depressed, and to relight all of said first indicator lamps that have been turned off when said one function key is released.

5. The apparatus recited in any one of the claims 1,2, 3 and 4, wherein said telephone keyset apparatus further comprises a plurality of function keys and a plurality of second indicator lamps, each of said second indicator lamps being associated with a function key, and wherein means (e) includes means responsive to the operation of said one function key for turning on the second indicator lamp associated with that key.

6. The apparatus recited in claim 5, wherein means (e) is further operative to turn off the second indicator lamp associated with said one function key after a predetermined time interval.

7. The apparatus recited in claim 5, wherein means (e) is further operative to turn off the second indicator lamp associated with said one function key when said one function key is released.

8. The apparatus recited in claim 1, wherein each of said line keys include mechanical means for locking the respective key in the down position when said key is depressed and said telephone apparatus further includes a line hold key which releases all mechanical means when depressed, whereby the telephone keyset apparatus remains connected to a line although none of said line keys are locked in the down position.

9. The apparatus of claim 1, wherein each of said line keys is a pushbutton key which return to an up position after being depressed and without locking in its down position.

10. Telephone keyset apparatus comprising, in combination:
(a) a plurality of dialing keys for dialing a telephone number;
(b) a plurality of line keys, each associated with a single telephone line, for selecting the associated telephone line;
(c) a plurality of indicator lamps, each associated with one of said line keys, for indicating, when illuminated, that its associated telephone line is in use;
(d) a receiver hook switch for enabling connection of the telephone keyset apparatus to a telephone line when released; and
(e) means responsive to the operation of said hook switch for turning off all of said indicator lamps with the exception of that lamp associated with that telephone line to which the telephone keyset apparatus is currently connected.

11. The apparatus recited in claim 10, wherein said lamp which is not turned off by means (e) is associated with a telephone line to which the telephone keyset apparatus is automatically connected, upon going off hook, by an outgoing call automatic line preference.

12. The apparatus recited in claim 10, wherein said lamp which is not turned off by means (e) is associated with a telephone line to which the telephone keyset apparatus is automatically connected, upon going on hook and then off hook, by an incoming call automatic line preference.

13. The apparatus recited in claim 10, wherein means (e) is responsive to the depressing and release of said hook switch for turning off said indicator lamps.

* * * * *